United States Patent
Chen

(10) Patent No.: US 8,879,609 B2
(45) Date of Patent: Nov. 4, 2014

(54) COMMUNICATION SYSTEM, COMMUNICATION DEVICE, AND METHOD FOR OPERATING COMMUNICATION SYSTEM

(71) Applicant: MegaChips Corporation, Osaka (JP)

(72) Inventor: Handa Chen, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 13/785,510

(22) Filed: Mar. 5, 2013

(65) Prior Publication Data
US 2013/0259105 A1    Oct. 3, 2013

(30) Foreign Application Priority Data
Mar. 28, 2012 (JP) ................. 2012-072766

(51) Int. Cl.
| | |
|---|---|
| *H04L 5/16* | (2006.01) |
| *H04L 27/00* | (2006.01) |
| *H04L 7/00* | (2006.01) |
| *H04B 3/54* | (2006.01) |

(52) U.S. Cl.
CPC .......... *H04B 3/542* (2013.01); *H04B 2203/542* (2013.01)
USPC ............................. 375/219; 375/259; 375/358

(58) Field of Classification Search
CPC ............... H04B 3/54; H04B 2203/542; H04B 2203/5416; H04B 3/546; H04B 340/538; H04B 455/402; H04B 370/445; H04B 370/509; H04B 375/257; H04L 12/2803; H04L 25/02; H04L 7/0054; H04L 12/413; G01R 31/1272; H02J 3/24; H02J 3/0605; G08B 13/2488; G05B 2219/21136; H04J 3/0605; H04J 3/06

USPC ........ 375/219, 259, 260, 257, 256, 355, 354, 375/358, 362, 363, 364, 365, 366, 377; 340/FOR. 465, 538, 12.32, 13.23, 340/FOR. 405; 370/503, 509, 510, 511, 370/512, 513, 514; 455/402, FOR. 202; 714/748, 749

See application file for complete search history.

(56) References Cited

U.S. PATENT DOCUMENTS

| | | | |
|---|---|---|---|
| 4,845,466 A * | 7/1989 | Hariton et al. ................. | 375/257 |
| 6,559,757 B1 * | 5/2003 | Deller et al. ...................... | 307/3 |
| 2010/0183029 A1* | 7/2010 | Yoshizawa et al. ............ | 370/470 |
| 2012/0126612 A1* | 5/2012 | Hurwitz et al. ................... | 307/3 |

FOREIGN PATENT DOCUMENTS

JP     2009-284159     12/2009

* cited by examiner

*Primary Examiner* — Tesfaldet Bocure
(74) *Attorney, Agent, or Firm* — Oblon, Spivak, McClelland, Maier & Neustadt, L.L.P.

(57) ABSTRACT

A communication system includes a first communication device and a second communication device that performs power line communication with the first communication device via an electric power line, wherein the first communication device transmits a plurality of times an initial packet signal added with an error detection code in each of reference timing at regular intervals in the vicinity of zero crossing timing. The second communication device determines whether a reception state is good or poor based on a result of the error detection on each of the received initial packet signals, and when the reception state is poor, the second communication device transmits an ACK signal in timing shifted by micro time from the reference timing after receiving the initial packet signal. Then, the first communication device transmits a data packet signal in timing at the regular interval after the timing of receiving the ACK signal.

7 Claims, 8 Drawing Sheets

F I G . 1
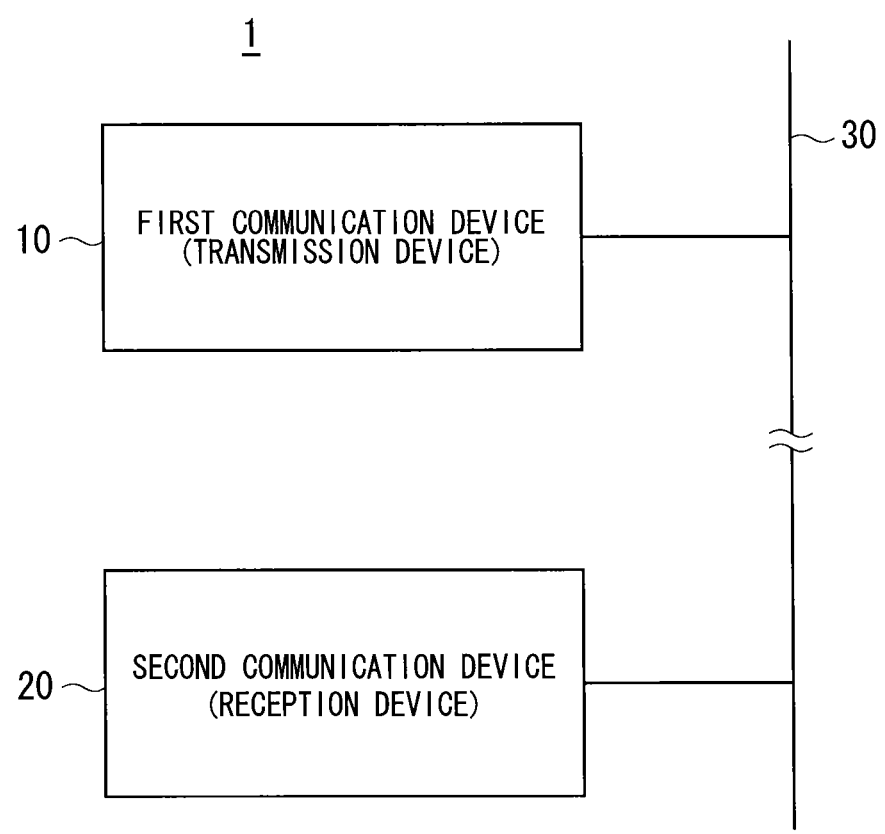

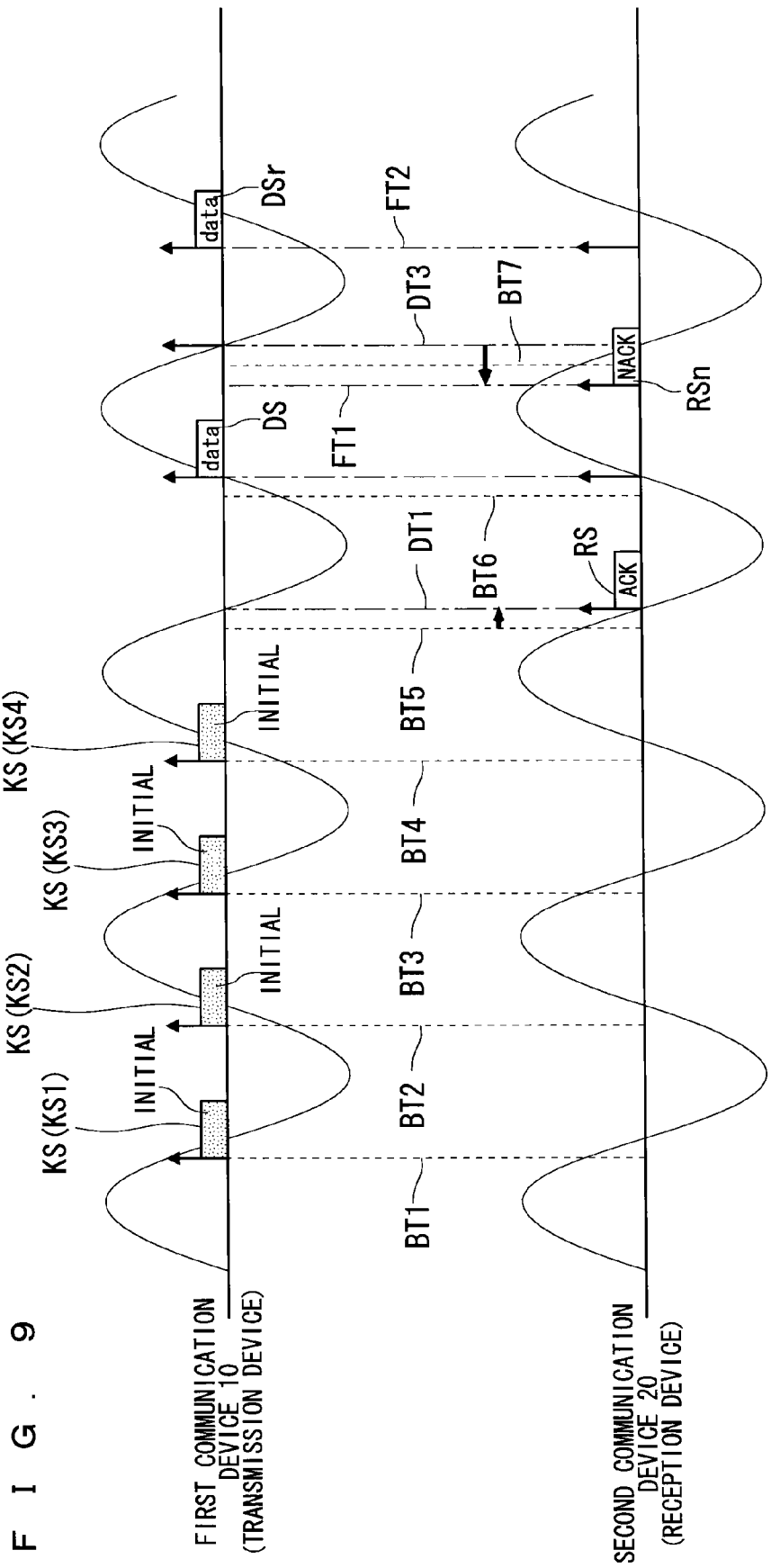

COMMUNICATION SYSTEM, COMMUNICATION DEVICE, AND METHOD FOR OPERATING COMMUNICATION SYSTEM

BACKGROUND OF THE INVENTION

1. Field of the Invention

The present invention relates to a communication technique.

2. Description of the Background Art

In recent years, power line communication (PLC) using a power line, which is originally used for electric power supply, has been put to practical use. In the power line communication, a communication signal with a higher frequency than a commercial power supply frequency is superimposed on commercial electric power line, to perform communication.

However, since the power line communication is a communication system in which an electric power line connected with home electric appliances is used as a transmission media, communication quality may deteriorate under the influence of noise of the electric appliances (referred to as "home appliance noise").

The influence of this home appliance noise increases in the vicinity of a peak where a commercial alternate current (AC) voltage waveform has a peak amplitude and hence, in order to avoid this, there has been proposed a technique of performing power line communication in a so-called vicinity of a zero crossing where the AC voltage waveform has zero amplitude (e.g. Japanese Patent Application Laid-Open No. 2009-284159).

In the case of transmitting and receiving data packets in the vicinity of the zero crossing, zero crossing timing is detected in which the commercial AC voltage waveform has zero amplitude, and based on the detected zero crossing timing, the timing of transmitting and receiving data packets is decided However, since the accuracy in detection of the zero crossing timing is low, if the detected timing is shifted from the actual zero crossing timing, the communication performance may be affected by home appliance noise severely.

Furthermore, in the zero crossing timing, a cyclic phase change, which is called phase noise generated from a switching power supply or the like, may appear in the vicinity of the zero crossing timing, and when such a phase change occurs during a transmission period of a data packet, the data packet may be damaged and not be recovered properly by receivers.

Moreover, cyclic pulse noise in synchronization with the zero crossing timing may exist in the electric power line, and when communication is performed in the vicinity of the zero crossing, it may be affected by the pulse noise.

SUMMARY OF THE INVENTION

Accordingly, it is an object of the present invention to provide a technique capability of realizing highly reliable communication in the case of performing power line communication by zero crossing transmission.

A first aspect of a communication system according to the present invention is a communication system, including: a first communication device; and a second communication device that performs electric power line communication with the first communication device with an electric power line used as a transmission media, wherein the first communication device has detection means for detecting zero crossing timing at regular intervals in a commercial power supply, and transmission means for transmitting a plurality of times an initial signal added with an error detection code in each of reference timing at the regular intervals in the vicinity of the zero crossing timing, the second communication device has error detecting means for performing error detection on each received initial signal based on the error detection code added to each initial signal, determination means for determining whether a reception state is good or poor based on a result of the error detection on each of the initial signals, and transmission means for transmitting a confirmation response signal with respect to the initial signal in the reference timing after receiving the initial signal in the case of the reception state having being determined to be good by the determination means, and transmitting the confirmation response signal in timing shifted in a shifted direction by micro time from the reference timing after receiving the initial signal in the case of the reception state having being determined to be poor, the first communication device further has reception means for receiving the confirmation response signal, and the transmission means of the first communication device transmits a transmission signal including actual data in timing at the regular interval after the timing of receiving the confirmation response signal.

Further, a second aspect of the communication system according to the present invention is in the first aspect, the micro time is set based on a frequency of the commercial power supply.

Moreover, a third aspect of the communication system according to the present invention is in the first or second aspect, the transmission means of the second communication device transmits a negative response signal, indicating that the actual data could not be acquired, in timing shifted in the opposite direction to the shifted direction with respect to the confirmation response signal in the case of not having been able to acquire the actual data from the transmission signal, and the transmission means of the first communication device retransmits a transmission signal including the actual data in timing at the regular interval after the timing of receiving the negative response signal.

A first aspect of a communication device according to the present invention is a communication device on a transmission side, which performs electric power line communication with a communication device on a reception side with an electric power line used as a transmission media, the communication device on the transmission side including: detection means for detecting zero crossing timing at regular intervals in a commercial power supply; and transmission means for transmitting a plurality of times an initial signal added with an error detection code in each of reference timing at the regular intervals in the vicinity of the zero crossing timing, wherein the communication device on the reception side has error detecting means for performing error detection on each received initial signal based on the error detection code added to each initial signal, determination means for determining whether a reception state is good or poor based on a result of the error detection on each of the initial signals, and transmission means for transmitting a confirmation response signal with respect to the initial signal in the reference timing after receiving the initial signal in the case of the reception state having being determined to be good by the determination means, and transmitting the confirmation response signal in timing shifted by micro time from the reference timing after receiving the initial signal in the case of the reception state having being determined to be poor, the communication device on the transmission side further has reception means for receiving the confirmation response signal, and, the transmission means of the communication device on the transmission side transmits a transmission signal including actual data in timing at the regular interval after the timing of receiving the confirmation response signal.

A second aspect of the communication device according to the present invention is a communication device on a reception side, which performs electric power line communication with a communication device on a transmission side with an electric power line used as a transmission media, wherein the communication device on the transmission side has detection means for detecting zero crossing timing at regular intervals in a commercial power supply, and transmission means for transmitting a plurality of times an initial signal added with an error detection code in each of reference timing at the regular intervals in the vicinity of the zero crossing timing, and the communication device on the transmission side including error detecting means for performing error detection on each received initial signal based on the error detection code added to each initial signal; determination means for determining whether a reception state is good or poor based on a result of the error detection on each of the initial signals; and transmission means for transmitting a confirmation response signal with respect to the initial signal in reference timing after receiving the initial signal in the case of the reception state having being determined to be good by the determination means, and transmitting the confirmation response signal in timing shifted by micro time from the reference timing after receiving the initial signal in the case of the reception state having being determined to be poor.

Further, a method for operating a communication system according to the present invention is a method for operating a communication system, which includes a first communication device and a second communication device that performs electric power line communication with the first communication device with an electric power line used as a transmission media, the method including the steps of: a) detecting zero crossing timing at regular intervals in a commercial power supply in the first communication device; b) transmitting a plurality of times an initial signal added with an error detection code in each of reference timing at the regular intervals in the vicinity of the zero crossing timing in the first communication device; c) performing error detection on each received initial signal based on the error detection code added to each initial signal in the second communication device; d) determining whether a reception state is good or poor based on a result of the error detection on each of the initial signals in the second communication device; e) transmitting a confirmation response signal with respect to the initial signal in reference timing after receiving the initial signal in the case of the reception state having being determined to be good by the determination means in the second communication device, and transmitting the confirmation response signal in timing shifted by micro time from the reference timing after receiving the initial signal in the case of the reception state having being determined to be poor in the second communication device; and f) receiving the confirmation response signal, and thereafter transmitting a transmission signal that includes actual data in timing at the regular interval after the timing of receiving the confirmation response signal in the first communication device.

A fourth aspect of a communication system according to the present invention is a communication system, including: a first communication device; and a second communication device that performs electric power line communication with the first communication device with an electric power line used as a transmission media, wherein the first communication device has detection means for detecting zero crossing timing at regular intervals in a commercial power supply, and transmission means for transmitting an initial signal added with an error detection code in one reference timing out of respective pieces of reference timing at the regular intervals in the vicinity of the zero crossing timing, and the second communication device has error detecting means for performing error detection on each received initial signal based on the error detection code added to each initial signal, determination means for determining whether a reception state is good or poor based on a result of the error detection on each of the initial signals, and transmission means for transmitting a response signal with respect to the initial signal in reference timing after receiving the initial signal in the case of the reception state having being determined to be good by the determination means, and transmitting the response signal in timing shifted by micro time from the reference timing after receiving the initial signal in the case of the reception state having being determined to be poor, the first communication device further has reception means for receiving the response signal, and the transmission means of the first communication device transmits a transmission signal including actual data in timing at the regular interval after the timing of receiving the response signal.

According to the foregoing present invention, in the case of performing power line communication in the vicinity of a zero crossing, highly reliable communication can be realized.

BRIEF DESCRIPTION OF THE DRAWINGS

FIG. 1 is a constitutional diagram of a communication system according to the present preferred embodiment;

FIGS. 8 and 9 are diagrams each showing a communication aspect of a communication system according to an alternative example.

DESCRIPTION OF THE PREFERRED EMBODIMENTS

Hereinafter, preferred embodiments will be described with reference to the drawings. It should be noted that elements provided with the same numeral in different drawings show elements being the same as or corresponding to each other.

1. Preferred Embodiment

[1-1. Configuration of Communication System]

FIG. 1 is a constitutional diagram of a communication system 1 according to the present preferred embodiment.

As shown in FIG. 1, the communication system 1 has a first communication device 10 and a second communication device 20. The first communication device 10 and the second communication device 20 in the communication system 1 are each connected to an electric power line 30. Then, the first communication device 10 and the second communication device 20 are configured so as to be communicable to each other by power line communication (PLC) with an electric power line 30 used as a transmission media.

Further, the power line communication between the communication devices 10 and 20 is performed using an OFDM (Orthogonal Frequency Division Multiplexing) signal obtained by synthesizing a plurality of subcarriers orthogonal to each other on a frequency axis. Then, the OFDM signals are divided into data packet in time and transmitted by packet unit.

In addition, although a case will be illustrated below where the first communication device 10 functions mainly as a transmission device and the second communication device 20 functions mainly as a reception device, the first communication device 10 and the second communication device 20 may have similar communication functions.

Figure 2:
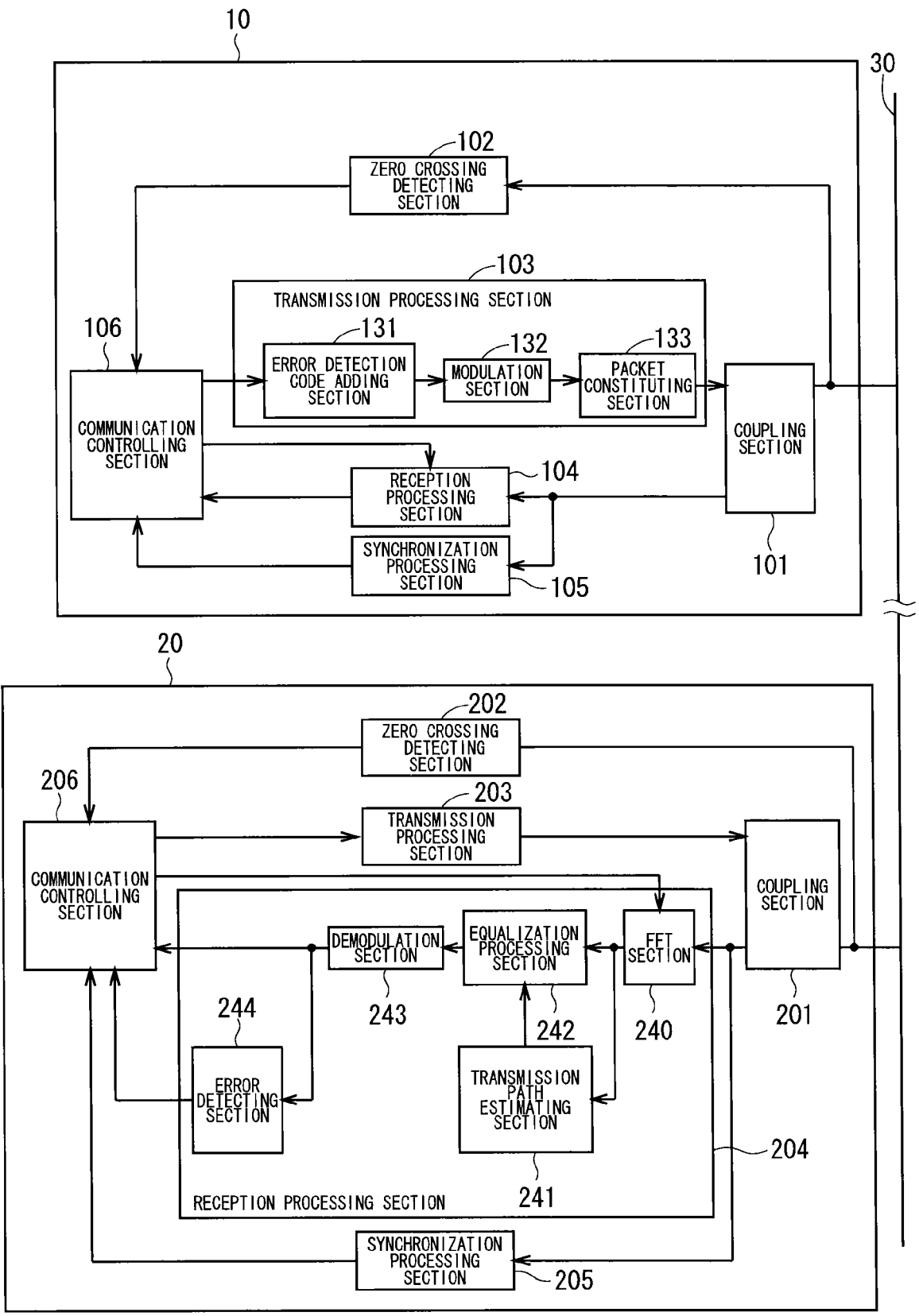
FIG. 2 is a block diagram showing functional configurations of a first communication device and a second communication device.

Hereinafter, respective configurations of the first communication device 10 and the second communication device 20 which constitute the communication system 1 will be described in this order. FIG. 2 is a block diagram showing functional configurations of the first communication device 10 and the second communication device 20.

As shown in FIG. 2, the first communication device (transmission device) 10 is provided with a coupling section 101, a zero crossing detecting section 102, a transmission processing section 103, a reception processing section 104, a synchronization processing section 105, and a communication controlling section 106.

The coupling section 101 is connected with the electric power line 30, and has a function to convert an OFDM signal inputted from the transmission processing section 103 to a communication signal (PLC signal) for performing power line communication, and output the PLC signal as a transmission signal (sending signal) to the electric power line 30. Further, the coupling section 101 has a function to take the PLC signal out of the electric power line 30, and output the PLC signal as a reception signal to the reception processing section 104.

The zero crossing detecting section (detection means) 102 detects timing in which a commercial AC voltage waveform has zero amplitude (also referred to as "zero crossing timing"), and outputs a detection signal in synchronization with the detected zero crossing timing. It is to be noted that an interval between adjacent zero crossing timing is a regular interval, and also referred to as a "zero crossing interval".

The transmission processing section 103 has an error detection code adding section 131, a modulation section 132 and a packet constituting section 133, acquires data as a transmission object (also referred to as "transmission data") from the communication controlling section 106, and modulates the transmission data, to generate an OFDM signal including transmission data.

Specifically, the error detection code adding section 131 adds an error detection code such as a checksum or a CRC (Cyclic Redundancy Check) code to the transmission data inputted from the communication controlling section 106, and outputs the data after the addition to the modulation section 132.

The modulation section 132 performs primary modulation and inverse fast Fourier transformation on the transmission data after the addition of the error detection code, to generate an OFDM signal. The generated OFDM signal is outputted to the packet constituting section 133.

The packet constituting section 133 adds a preamble signal to the OFDM signal outputted from the modulation section 132, to generate a packet-unit signal (also referred to as "packet signal").

Figure 3:
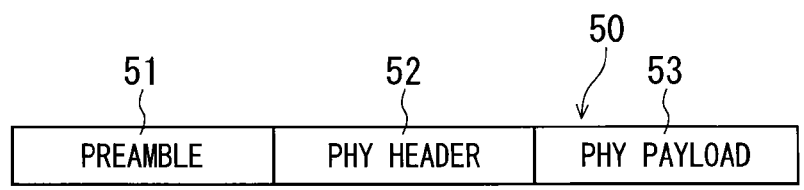
FIG. 3 is a diagram showing a configuration of a data packet.

A configuration of the packet (packet signal) that is generated in the packet constituting section 133 will be described here. FIG. 3 is a diagram showing the configuration of the packet.

As shown in FIG. 3, a packet 50 includes a preamble 51, a PHY (physical layer) header 52 that follows the preamble 51, and a PHY payload 53 that follows the PHY header 52.

The preamble 51 is used for a variety of synchronization processing, such as detection processing performed on the reception side for a packet signal transmitted from the transmission side, and symbol timing synchronization.

The PHY header 52 includes header information for communication control, such as a transmission speed, a data length and the like of subsequently transmitted transmission data.

The PHY payload 53 includes transmission data for an object to be transmitted.

As described above, the packet constituting section 133 generates a packet signal including the preamble 51, the PHY header 52 and the PHY payload 53, and outputs the packet signal to the coupling section 101.

Returning to the description of the first communication device 10 in FIG. 2, the reception processing section 104 has a function to demodulate the reception signal inputted from the coupling section 101 and generate reception data. The reception data generated in the reception processing section 104 is outputted to the communication controlling section 106.

In cooperation with the communication controlling section 106, the synchronization processing section 105 performs a variety of synchronization processing such as frequency synchronization and symbol timing synchronization (symbol synchronization).

The communication controlling section 106 controls a communication operation in the first communication device 10.

Specifically, the communication controlling section 106 generates transmission data, and outputs the transmission data to the error detection code adding section 131 of the transmission processing section 103. Further, the communication controlling section 106 controls the timing of outputting a transmission signal to the outside of the first communication device 10 (also referred to as "transmission timing" or "communication timing").

More specifically, the communication controlling section 106 specifies zero crossing timing based on a detection signal from the zero crossing detecting section 102, and controls the coupling section 101 so as to output a transmission signal in timing (reference timing) in the vicinity of the zero crossing timing. In such a manner, the communication controlling section 106 functions as transmission means in cooperation with the coupling section 101. Furthermore, when receiving a confirmation response signal (ACK (Acknowledgement) signal) indicating that a transmission signal has been received from the second communication device 20, the communication controlling section 106 adjusts the timing of transmitting a transmission signal to be subsequently transmitted based on the timing of receiving the ACK signal.

Next, the configuration of the second communication device 20 (reception device) will be described in detail. Since the second communication device 20 has a similar configuration to that of the first communication device 10, a characteristic portion as the reception device (configuration of a reception processing section 204) will be described in more detail here.

As shown in FIG. 2, the second communication device 20 is provided with a coupling section 201, a zero crossing detecting section 202, a transmission processing section 203, the reception processing section 204, a synchronization processing section 205, and a communication controlling section 206.

The coupling section 201 has a similar function to that of the foregoing coupling section 101. That is, the coupling section 201 is connected to the electric power line 30, and has a function to convert an OFDM signal inputted from the transmission processing section 203 to a PLC signal, and output the PLC signal to the electric power line 30. Further, the coupling section 201 has a function to take the PLC signal out of the electric power line 30, and output the PLC signal as a reception signal to the reception processing section 204.

The zero crossing timing 202 detects zero crossing timing in which a commercial AC voltage waveform has zero amplitude, and outputs a detection signal in synchronization with the detected zero crossing timing.

Similar to the foregoing transmission processing section 103, the transmission processing section 203 acquires transmission data from the communication controlling section 206, and modulates the transmission data, to generate an OFDM signal including transmission data.

The reception processing section (reception processing means) 204 has an FFT section 240, a channel estimating section 241, an equalization processing section 242, a demodulation section 243, and an error detecting section 244, and has a function to demodulate the reception signal inputted from the coupling section 201 and generate reception data.

Specifically, the FFT section 240 executes so-called multicarrier demodulation processing, which is to perform fast Fourier transformation on the reception signal and convert a signal in time domain to a signal in a frequency domain. The reception signal outputted from the FFT section 240 after the multicarrier demodulation processing is inputted into the channel estimating section 241 and the equalization processing section 242.

The channel estimating section 241 estimates the channel characteristic in one packet period by use of the preamble 51. The channel characteristic having been estimated (also referred to as "estimated channel characteristic") is transmitted to the equalization processing section 242.

The equalization processing section 242 performs equalization processing which is to divide the reception signal by the estimated channel characteristic. The reception signal outputted from the equalization processing section 242 after the equalization processing is outputted to the demodulation section 243.

The demodulation section 243 performs subcarrier demodulation processing such as demapping processing on the reception signal after the equalization processing, to output demodulated reception data. Error correction by means of Viterbi decoding is performed on the reception data after the demodulation, the reception data being outputted from the demodulation section 243, and the reception data after the error correction is inputted into the error detecting section 244 and the communication controlling section 206.

The error detecting section 244 performs error detection of the reception data based on an error detection code added to the reception data. A result of the error detection is outputted to the communication controlling section 206.

In cooperation with the communication controlling section 206, the synchronization processing section (synchronization processing means) 205 performs a variety of synchronization processing such as frequency synchronization which is to adjust an error of a carrier frequency, and symbol timing synchronization which is to detect an OFDM signal having reached the second communication device 20 and synchronize timing of an OFDM symbol and the multicarrier demodulation processing, and acquires synchronization information.

The communication controlling section 206 controls a communication operation in the second communication device 20. Specifically, the communication controlling section 206 acquires reception data demodulated in the reception processing section 204. The communication controlling section 206 then generates an ACK signal and outputs it to the transmission processing section 203.

Further, the communication controlling section 206 also has a function as a reception-state determining section for determining a reception state based on a result of error detection. The communication controlling section 206 then controls the timing of outputting the ACK signal to the outside of the second communication device 20 in accordance with a result of determination of the reception state.

[1-2. Communication Aspect of Power Line Communication]

Figure 4:
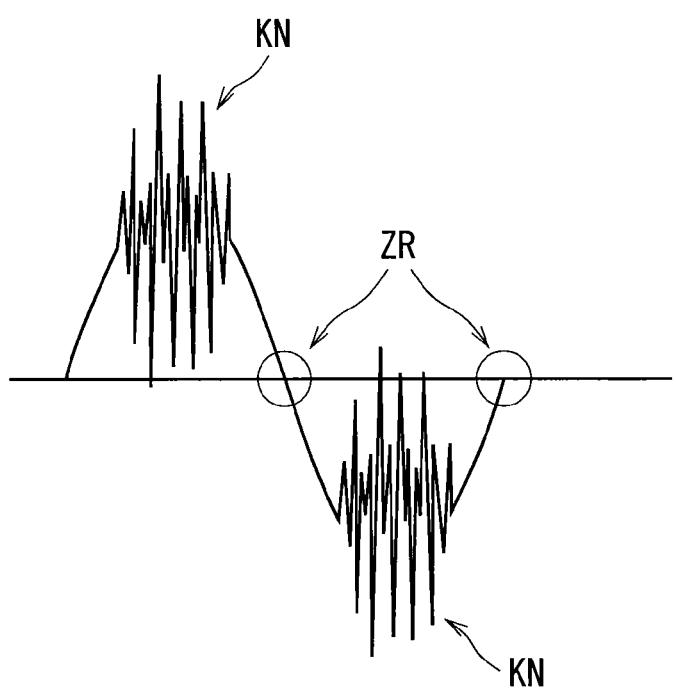
FIG. 4 is a diagram showing an overview of a communication aspect in the communication system.
Figure 5:
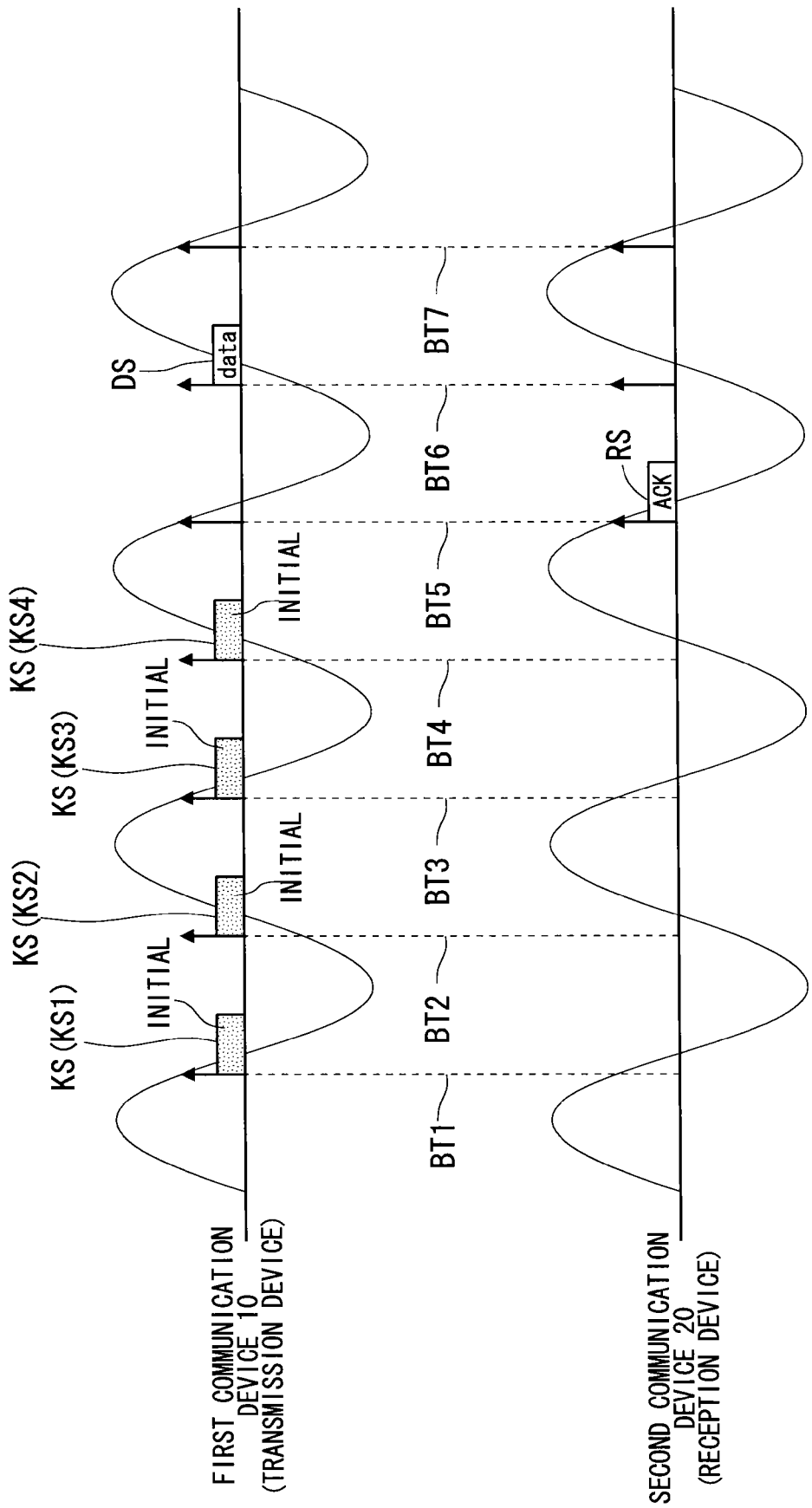
FIG. 5 is a diagram showing a communication aspect in the communication system.

Next, there will be described a communication aspect of power line communication performed between the communication devices 10 and 20 having the configurations as described above. FIG. 4 is a diagram showing an overview of a communication aspect in the communication system 1. FIG. 5 is a diagram showing a communication aspect in the communication system 1.

The power line communication that is performed between the communication devices 10 and 20 is performed in a specific period in order to avoid the influence of home appliance noise that is generated by an electric appliance connected to the electric power line 30.

Specifically, as shown in FIG. 4, since the influence of home appliance noise KN becomes large in the vicinity of a peak where a commercial AC voltage waveform has a peak amplitude, power line communication between the communication devices 10 and 20 is performed in a specific period in a so-called vicinity ZR of a zero crossing (also referred to as "zero crossing period") where the AC voltage waveform has zero amplitude.

As thus described, in order to avoid the influence of the home appliance noise, the communication system 1 is configured such that power line communication is performed in the zero crossing period including a zero crossing point where the commercial AC voltage waveform has zero amplitude. It is to be noted that, herein, timing in which the commercial AC voltage waveform has zero amplitude is also referred to as "zero crossing timing".

As shown in FIG. 5, at an initial stage before establishing communication, the first communication device 10 transmits a plurality of times an initial packet signal (initial signal) KS for establishing communication as a transmission signal in each of reference timing in the vicinity of the zero crossing timing. It is to be noted that the initial packet signal KS is a packet including the preamble 51 and the PHY header 52.

Meanwhile, after receiving the plurality of initial packet signals KS, the second communication device 20 transmits an ACK signal RS to the first communication device 10.

After receiving the ACK signal RS transmitted from the second communication device 20, the first communication device 10 transmits a data packet signal DS including actual data as transmission data (transmission actual data).

[1-3. Operation of Communication System]

Figure 6:
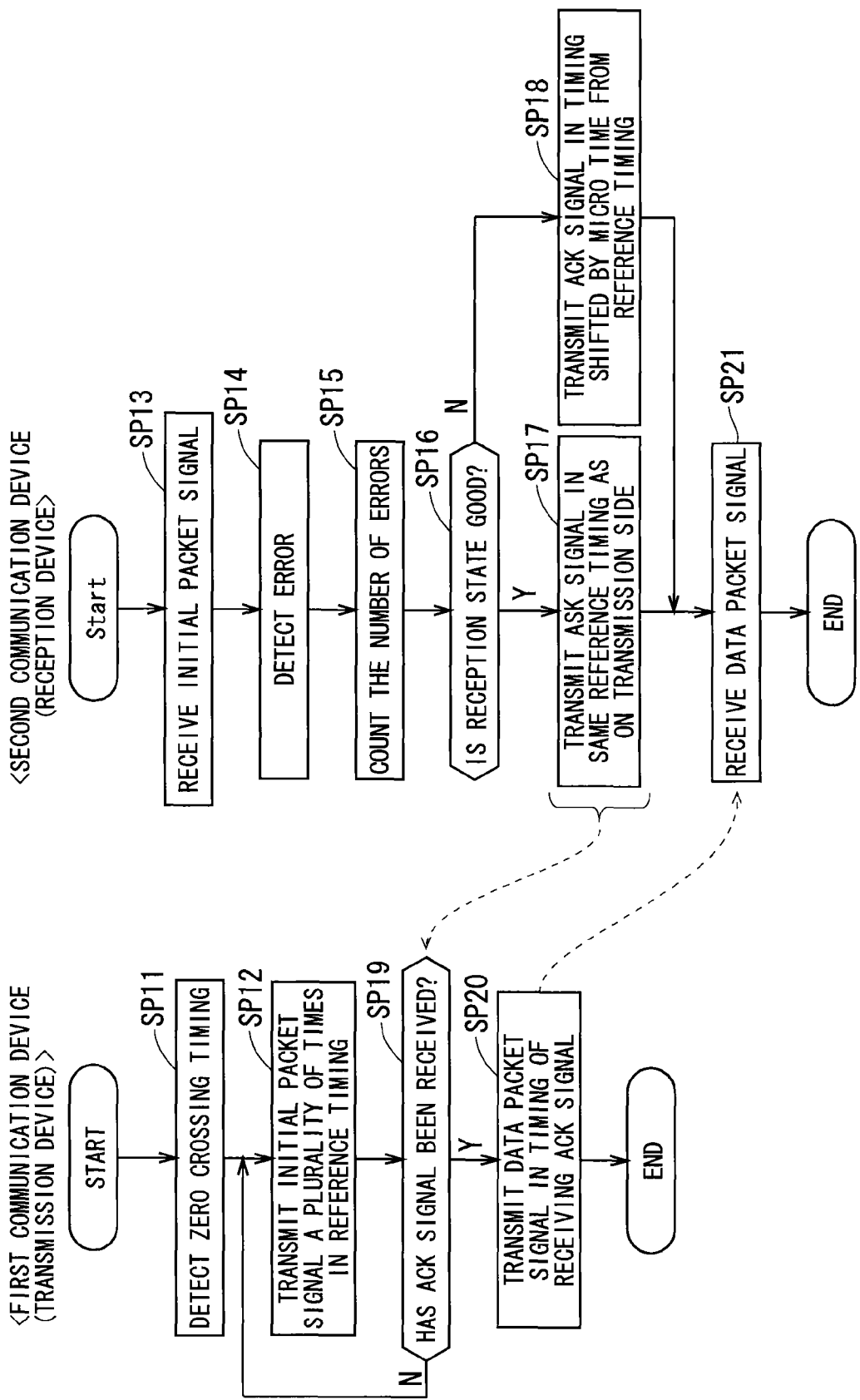
FIG. 6 is a flowchart showing an operation of the communication system.
Figure 7:
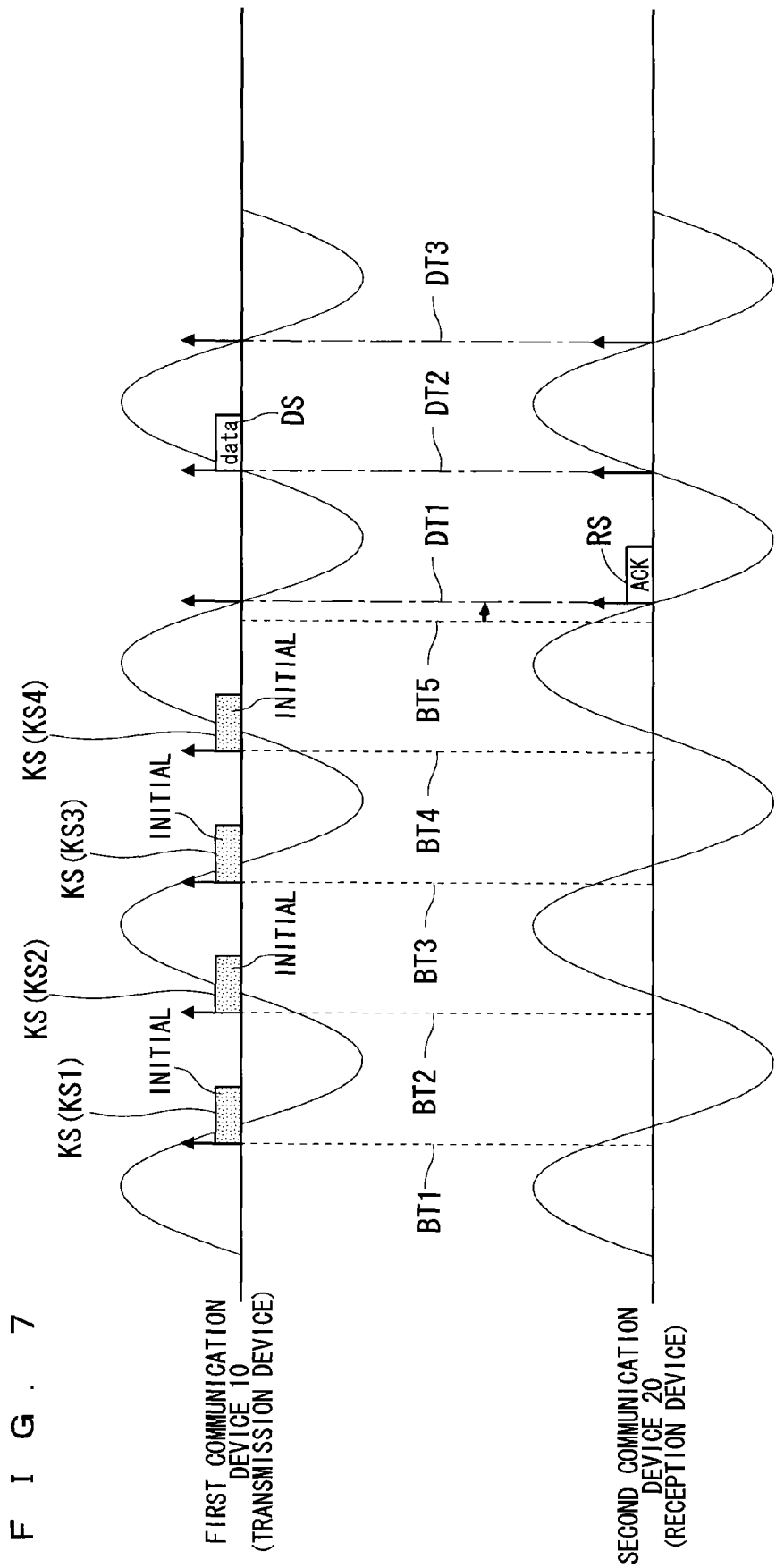
FIG. 7 is a diagram showing another communication aspect in the communication system.

Next, the operation of the communication system 1 will be detailed. FIG. 6 is a flowchart showing the operation of the communication system 1. It is to be noted that, although the operation of the first communication device 10 as the transmission device is described on the left and the operation of the second communication device 20 as the reception device is described on the right in FIG. 6, the operation of the communication system 1 will be described below in chronological order. FIG. 7 is a diagram showing another communication aspect in the communication system 1.

As shown in FIG. 6, first, in Step SP11, detection of zero crossing timing is performed by the zero crossing detecting section 102 in the first communication device 10 as the transmission device.

In next Step SP12, the initial packet signal KS is transmitted a plurality of times by the communication controlling section 106 of the first communication device 10 in each of reference timing in the vicinity of the zero crossing timing. FIG. 5 shows the aspect where initial packet signals KS1 to KS4 are transmitted four times respectively in reference timing BT1 to BT4 at regular intervals. It is to be noted that the regular interval between each reference timing is equivalent to a zero crossing interval between adjacent zero crossing timing.

Then, in Step SP13, the initial packet signal KS is received in the second communication device 20 as the reception device. When the initial packet signal KS is received, the operation step is shifted to Step SP14.

In Step SP14, demodulation processing is performed on the initial packet signal KS by the reception processing section 204 of the second communication device 20, and error detection based on the error detection code is further performed on data after the demodulation processing. It should be noted that the demodulation processing here includes multicarrier demodulation processing and subcarrier demodulation processing.

Such error detection is executed on each of the packet signals KS1 to KS4 transmitted in each of the reference timing BT1 to BT4 at regular intervals. Then, a result of the error detection is outputted to the communication controlling section 206.

In next Step SP15, the number of errors is counted by the communication controlling section 206 based on the result of the error detection.

In Step SP16, it is determined by the communication controlling section 206 whether the reception state of the packet signal is good or poor based on the number of errors. The good/poor determination on the reception state is, for example, performed based on whether or not the number of errors is a predetermined reference number or more. For example, in the case of receiving the initial packet signal KS four times, the reference number of errors, which is used as an indicator for the good/poor determination, may be set to two.

Then, when the number of errors is less than the reference number of times, the reception state is determined to be good, and the operation process is shifted to Step SP17.

In Step SP17, timing in which the initial packet signal KS was received, namely in the reference timing at the regular interval, the ACK signal RS is transmitted based on control of the communication controlling section 206. Specifically, as shown in FIG. 5, the ACK signal RS is transmitted in reference timing BT5 at the regular interval after the reference timing BT4 in which the initial packet signal KS was finally received.

As thus described, when the reception state is good, the communication timing remains unchanged, and the ACK signal RS is transmitted in the reference timing at the regular interval at which the initial packet signal KS was received.

On the other hand, when the number of errors is not less than the reference number of times, the reception state is determined to be poor in Step SP16, and the operation process is shifted to Step SP18.

In Step SP18, the ACK signal RS is transmitted based on control of the communication controlling section 206 in timing shifted by predetermined time (micro time) from the reference timing after the initial packet signal KS was received. Specifically, as shown in FIG. 7, the ACK signal RS is transmitted in timing DT1 shifted by micro time from the reference timing BT5 at the regular interval after the reference timing BT4 in which the initial packet signal KS was finally received. A shifted width from the reference timing BT5 is set to a varying value in accordance with a frequency of a commercial power supply, and the shifted width is preferably set to one eleventh to one thirteenth of the zero crossing interval. This is because, if the shifted width is excessively large, a signal is transmitted in timing deviating from the zero crossing period, thereby making the operation susceptible to home appliance noise, and if the shifted width is excessively small, the reception state cannot be improved. It is to be noted that the zero crossing interval is 10 ms in a commercial power supply with a frequency of 50 Hz, and the zero crossing interval is 8.3 ms in a commercial power supply with a frequency of 60 Hz.

Further, although FIG. 7 shows the aspect of shifting the timing of transmitting the ACK signal backward from the reference timing BT5, the timing may be shifted forward from the reference timing BT5.

As thus described, when the reception state is poor, the ACK signal RS is transmitted in changed communication timing. It should be noted that in Steps SP17 and SP18, in the case of making use of the zero crossing timing at the time of deciding the timing of communicating the ACK signal RS, the communication controlling section 206 specifies zero crossing timing based on a detection signal from the zero crossing detecting section 202.

In Step SP19, in the first communication device 10, it is determined whether or not to have received the ACK signal RS indicating receiving the initial packet signal KS. When the ACK signal RS is received, the operation process is shifted to Step SP20. On the other hand, when the ACK signal RS is not received, after the lapse of predetermined time from transmission of the initial packet signal KS, the operation process is shifted to Step SP12, and the initial packet signal KS is retransmitted.

In Step S20, the timing of transmitting the data packet signal DS is adjusted in accordance with the timing of receiving the ACK signal RS, and the data packet signal DS is transmitted in transmission timing in accordance with the reception timing.

Specifically, as shown in FIG. 5, when the ACK signal RS is received in the reference timing BT5 at the regular interval upon transmitting the initial packet signal KS, the data packet signal DS is transmitted in reference timing BT6 at the regular interval after the reception timing (reference timing BT5 here). Further, as shown in FIG. 7, when the ACK signal RS is received in the timing DT1 shifted by micro time from the reference timing BT5 at the regular interval after the reference timing BT4, the data packet signal DS is transmitted in timing DT2 at the regular interval after the reception timing DT1.

As thus described, in the communication system 1, the data packet signal DS is transmitted in reference timing at a regular interval when a communication state in the reference timing is good, and the data packet signal DS is transmitted in timing shifted by micro time from the reference timing when the communication state in the reference timing is poor.

As thus described, the communication system 1 has the first communication device 10 and the second communication device 20 that performs electric power line communication with the first communication device 10 in which the electric power line 30 is used as a transmission media. The first communication device 10 has the zero crossing detecting section 102 for detecting zero crossing timing at regular intervals in a commercial power supply, and the transmission means for transmitting a plurality of times the initial packet signal KS added with an error detection code in each of the reference timing BT1 to BT4 at the regular interval in the vicinity of the zero crossing timing.

Then, the second communication device 20 has the error detecting section 244 for performing error detection on each of the received initial packet signals KS based on the error detection code added to each initial packet signal KS, the determination means for determining whether a reception state is good or poor based on a result of the error detection on each of the initial packet signals KS, and the transmission means for transmitting the ACK signal RS with respect to the initial packet signal KS in the reference timing BT5 after finally receiving the initial packet signal KS in the case of the reception state having being determined to be good by the determination means, and transmitting the ACK signal RS with respect to the initial packet signal KS in the timing DT1 shifted by micro time from the reference timing BT5 after finally receiving the initial packet signal KS in the case of the reception state having being determined to be poor. Furthermore, the first communication device 10 has the reception means for receiving the ACK signal RS, and after receiving the ACK signal RS, the transmission means of the first communication device 10 transmits the data packet signal DS including actual data in timing DT2 at the regular interval after the timing DT1 of receiving the ACK signal RS.

As thus described, when the reception state of the initial packet signal KS is poor, the second communication device 20 of the communication system 1 transmits the ACK signal RS in the timing shifted from the reference timing, and the first communication device 10 transmits the data packet signal DS in timing at the zero crossing interval after the timing of receiving the ACK signal RS.

According to this, the data packet signal DS is transmitted in timing shifted from the reference timing at the regular interval in which the reception state was poor, thereby increasing the possibility of transmitting the data packet signal DS while avoiding the influence of phase noise or pulse noise. It is thereby possible to realize highly reliable power line communication in the communication system 1.

2. Modified Example

Although the preferred embodiment of the communication system 1 has been described above, the present invention is not restricted to the above described contents.

For example, although the initial packet signal KS has been transmitted a plurality of times in the above preferred embodiment, the number of times the initial packet signal KS is transmitted may be just one. In this case, the reception state is determined by the communication controlling section 206 based on a result of error detection performed once.

However, since the accuracy of the error detection performed using the error detection code is low, it is more preferable to transmit the initial packet signal KS a plurality of times and perform error detection a plurality of times so as to determine the reception state based on a plurality of error detection results.

Figure 8:
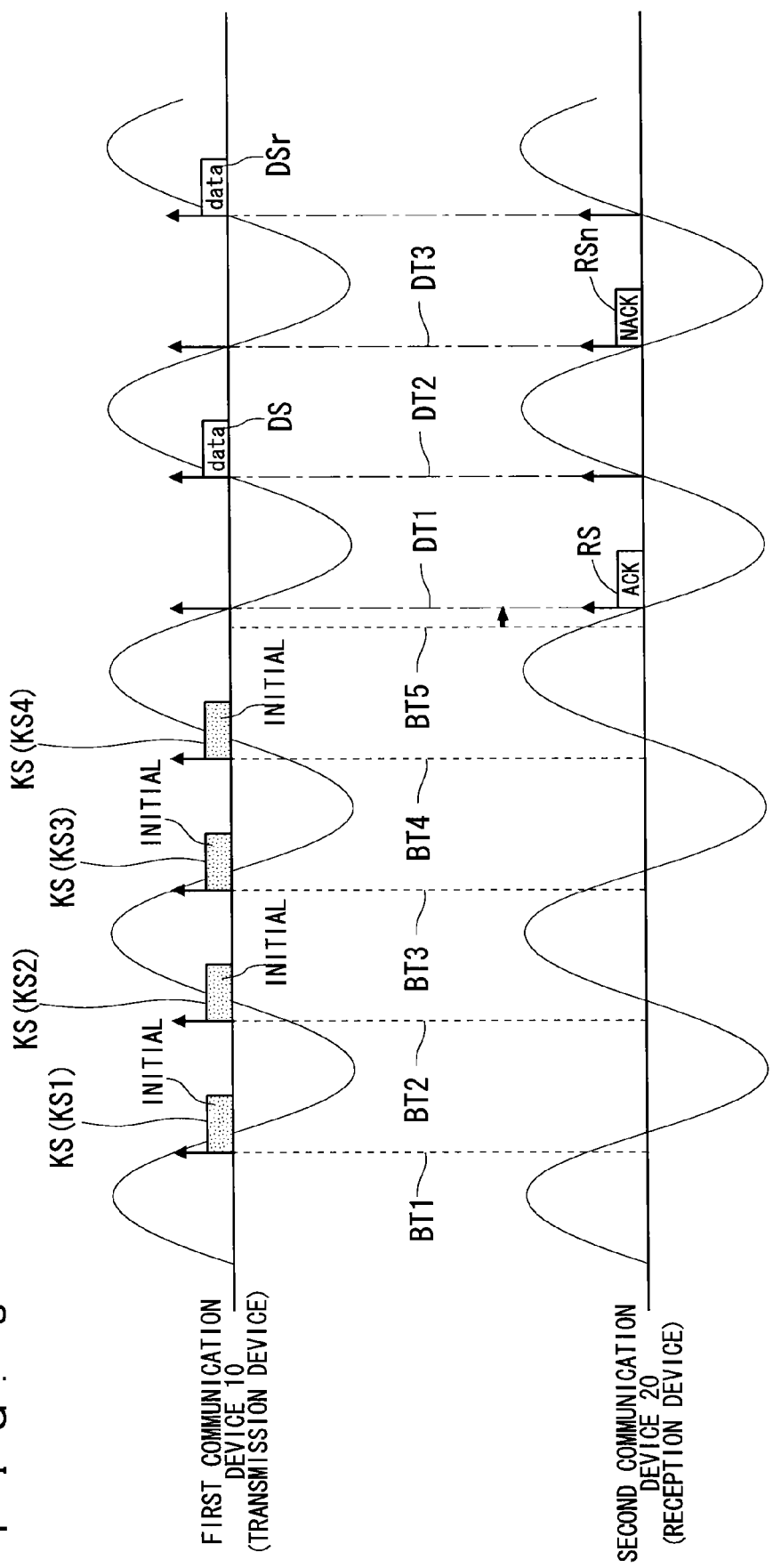

Further, as an operation aspect of the communication system 1 after transmitting the data packet signal DS, there can be considered an aspect as follows. FIGS. 8 and 9 are diagrams each showing a communication aspect of the communication system 1 according to a modified example.

Specifically, in the case of not having been able to acquire actual data, such as the case of not having been able to receive the data packet signal DS or the case of not having been able to obtain actual data from the data packet signal DS by demodulation processing, the second communication device 20 may have the aspect of transmitting a negative response signal (NACK (Negative-Acknowledgement) signal) RSn indicating that the actual data could not be acquired, as shown in FIG. 8. In this case, the first communication device 10 having received the NACK signal RSn retransmits a data packet signal DSr.

Further, the second communication device 20 further changes timing at the time of transmitting the NACK signal RSn. In this case, the first communication device 10 retransmits the data packet signal DSr in timing at the regular interval after the timing of receiving the NACK signal RSn.

For example, FIG. 9 shows the aspect of changing the timing of transmitting the ACK signal RS with respect to the initial packet signal KS from the reference timing BT5 to the timing DT1, and thereafter changing the timing of transmitting the NACK signal RSn with respect to the data packet signal DS from timing DT3 to timing FT1.

In the aspect of FIG. 9, while the ACK signal RS is transmitted in the timing DT1 shifted backward by micro time from the reference timing BT5 at the regular interval, the NACK signal RSn is transmitted in the timing FT1 shifted backward by micro time from reference timing BT7.

As thus described, in the case of transmitting a response signal twice, when changing the both pieces of transmission timing, it is preferable to shift the timing in the opposite direction at the time of transmitting the second response signal to a direction in which the timing is shifted at the time of transmitting the first response signal. Making the direction of shifting the timing opposite can enhance the possibility to receive the retransmitted data packet signal DSr. It is to be noted that in the aspect of FIG. 9, the first communication device 10 retransmits the data packet signal DSr in timing FT2 at the regular interval after the timing FT1 of receiving the NACK signal RSn.

What is claimed is:

1. A communication system, comprising:
   a first communication device; and
   a second communication device that performs electric power line communication with said first communication device with an electric power line used as a transmission media, wherein
   said first communication device has first circuitry configured to:
      detect zero crossing timing at regular intervals in a commercial power supply, and
      transmit a plurality of times an initial signal added with an error detection code in each of reference timing at said regular intervals in the vicinity of the zero crossing timing,
   said second communication device has second circuitry configured to:
      perform error detection on each received initial signal based on the error detection code added to each initial signal,
      determine whether a reception state is good or poor based on a result of the error detection on each of said initial signals, and
      transmit a confirmation response signal with respect to said initial signal in the reference timing after receiving said initial signal in the case of said reception state having being determined to be good by the second circuitry, and transmit said confirmation response signal at a time shifted in a shifted direction by micro time from the reference timing after receiving said initial signal in the case of said reception state having being determined to be poor, and the first circuitry is configured to receive said confirmation response signal, and transmit a transmission signal including actual data in timing at said regular interval from a time at which the confirmation response signal is received.

2. The communication system according to claim 1, wherein said micro time is set based on a frequency of the commercial power supply.

3. The communication system according to claim 1, wherein the second circuitry is configured to transmit a negative response signal, indicating that said actual data could not be acquired, in timing shifted in the opposite direction to said shifted direction with respect to said confirmation response signal in the case of not having been able to acquire said actual data from said transmission signal, and the first circuitry is configured to retransmit a transmission signal including the actual data in timing at said regular interval from a time at which the negative response signal is received.

4. A communication device on a transmission side, which performs electric power line communication with a communication device on a reception side with an electric power line used as a transmission media, wherein said communication device on the transmission side comprising first circuitry configured to:

detect zero crossing timing at regular intervals in a commercial power supply; and transmit a plurality of times an initial signal added with an error detection code in each of reference timing at said regular intervals in the vicinity of the zero crossing timing, said communication device on the reception side has second circuitry configured to:

perform error detection on each received initial signal based on the error detection code added to each initial signal, determine whether a reception state is good or poor based on a result of the error detection on each of said initial signals, and transmit a confirmation response signal with respect to said initial signal in the reference timing after receiving the initial signal in the case of said reception state having being determined to be good by said second circuitry, and transmitting said confirmation response signal at a time shifted by micro time from the reference timing after receiving said initial signal in the case of said reception state having being determined to be poor, and the first circuitry is configured to receive said confirmation response signal, and transmit a transmission signal including actual data in timing at said regular interval from a time at which the confirmation response signal is received.

5. A communication device on a reception side, which performs electric power line communication with a communication device on a transmission side with an electric power line used as a transmission media, wherein said communication device on the transmission side has a first circuitry configured to:

detect zero crossing timing at regular intervals in a commercial power supply, and transmit a plurality of times an initial signal added with an error detection code in each of reference timing at said regular intervals in the vicinity of the zero crossing timing, and the communication device on the transmission side comprising a second circuitry configured to:

perform error detection on each received initial signal based on the error detection code added to each initial signal;

determine whether a reception state is good or poor based on a result of the error detection on each of said initial signals; and transmit a confirmation response signal with respect to said initial signal in reference timing after receiving the initial signal in the case of said reception state having being determined to be good by said second circuitry, and transmit said confirmation response signal at a time shifted by micro time from the reference timing after receiving said initial signal in the case of said reception state having being determined to be poor.

6. A method for operating a communication system, which includes a first communication device and a second communication device that performs electric power line communication with said first communication device with an electric power line used as a transmission media, said method comprising the steps of:

(a) detecting zero crossing timing at regular intervals in a commercial power supply in said first communication device;

(b) transmitting a plurality of times an initial signal added with an error detection code in each of reference timing at said regular intervals in the vicinity of the zero crossing timing in said first communication device;

(c) performing error detection on each received initial signal based on the error detection code added to each initial signal in said second communication device;

(d) determining whether a reception state is good or poor based on a result of the error detection on each of said initial signals in said second communication device;

(e) transmitting a confirmation response signal with respect to said initial signal in reference timing after receiving the initial signal in the case of said reception state having being determined to be good by said determination means in said second communication device, and transmitting said confirmation response signal at a time shifted by micro time from the reference timing after receiving said initial signal in the case of said reception state having being determined to be poor in said second communication device; and (f) receiving said confirmation response signal, and thereafter transmitting a transmission signal that includes actual data in timing at said regular interval from a time at which the confirmation response signal is received in said first communication device.

7. A communication system, comprising:

a first communication device; and a second communication device that performs electric power line communication with said first communication device with an electric power line used as a transmission media, wherein said first communication device has first circuitry configured to:

detect zero crossing timing at regular intervals in a commercial power supply, and transmit an initial signal added with an error detection code in one reference timing out of respective pieces of reference timing at said regular intervals in the vicinity of the zero crossing timing, and said second communication device has a second circuitry configured to:

perform error detection on each received initial signal based on the error detection code added to each initial signal, determine whether a reception state is good or poor based on a result of the error detection on each of said initial signals, and transmit a response signal with respect to said initial signal in reference timing after receiving the initial signal in the case of said reception state having being determined to be good by the second circuitry, and transmit said response signal at a time shifted by micro time from the reference timing after receiving said initial signal in the case of said reception state having being determined to be poor, and the first circuitry is configured to receive said response signal, and transmit a transmission signal including actual data in timing at said regular interval from a time at which the response signal is received.

* * * * *